United States Patent [19]
Metz

[11] Patent Number: 5,950,997
[45] Date of Patent: Sep. 14, 1999

[54] TELESCOPING STRUT CONSTRUCTION

[76] Inventor: Joseph R. Metz, 13 Old Sib Rd., Ridgefield, Conn. 06877

[21] Appl. No.: 08/841,767

[22] Filed: May 5, 1997

[51] Int. Cl.⁶ .................................................. F16F 15/03
[52] U.S. Cl. ........................... 267/255; 403/108; 403/328
[58] Field of Search ............................ 267/255; 188/300; 403/317, 108, 109.1, 109.5, 103, 328, 109.3, 327

[56] References Cited

U.S. PATENT DOCUMENTS

| | | | |
|---|---|---|---|
| 3,945,744 | 3/1976 | Metz | 403/109.3 |
| 5,265,970 | 11/1993 | LaBarre | 403/108 |
| 5,366,313 | 11/1994 | LaBarre | 403/108 |
| 5,579,875 | 12/1996 | Vargas et al. | 188/300 |
| 5,632,568 | 5/1997 | Fechter | 403/328 |
| 5,779,385 | 7/1998 | Fechter | 403/328 |

*Primary Examiner*—Christopher P. Schwartz
*Assistant Examiner*—Melanie Talavera
*Attorney, Agent, or Firm*—H. Gibner Lehmann; K. Gibner Lehmann

[57] ABSTRACT

A strut construction for holding aircraft cowlings in a raised position, comprises first and second telescoping members which are relatively shiftable between a collapsed inoperative strut position wherein the members are nested together, and an almost fully extended operative load-bearing position wherein the members are only partially nested, the relative shifting of said telescoping members to their partially extended operative position causing a blocking of any collapsing movement. The strut has a spring-charged collar which is slidable on one telescoping member between blocking and unblocking positions, and the collar has a latch which is responsive to its manual shifting to its unblocking position against the spring-action thereof, for holding the collar in an unblocking position. Such shifting unblocks the telescoping members, thereby to enable them to be relatively shifted to their collapsed position only after the cowling has first been raised to the full extent of its movement.

15 Claims, 11 Drawing Sheets

| FIG. 3A | FIG. 3B | FIG. 3C |

TELESCOPING STRUT CONSTRUCTION

CROSS REFERENCES TO RELATED APPLICATIONS/PATENTS

1. U.S. Pat. No. 5,265,970 issued Nov. 30, 1993, entitled STRUT CONSTRUCTION, and having common ownership with the present application. The entire disclosure of this patent is specifically incorporated into the present application, by specific reference thereto.

STATEMENT AS TO RIGHTS TO INVENTIONS MADE UNDER FEDERALLY-SPONSORED RESEARCH AND DEVELOPMENT.

Research and development of the present invention and application have not been Federally-sponsored, and no rights are given under any Federal program.

BACKGROUND OF THE INVENTION

1. Field of the Invention

This invention relates generally to telescoping strut constructions, and more particularly to safety-lock structures associated therewith, which tend to avoid accidental or inadvertent release while the strut is under load.

2. Description of the Related Art Including Information Disclosed Under 37 CFR Sections 1.97–1.99

The following prior art references are hereby cited as being of interest in the field to which the present invention pertains:

| U.S. Pat. Nos.: | | |
|---|---|---|
| 3,367,689 | 3,390,874 | 3,442,541 |
| 3,469,871 | 3,945,744 | 4,014,467 |
| 4,362,415 | 4,366,945 | 4,453,449 |
| 4,453,748 | 4,546,956 | 4,682,795 |
| 4,960,344 | 5,066,049 | 5,265,970 |

U.S. Pat. No. 3,442,541 discloses a telescoping strut construction having inner and outer members, and a locking sleeve that is carried on one of the members and which is shiftable axially on the one member between locking and unlocking positions, to effect either a lock or a release of the members with respect to one another. In accomplishing the locking function, the inner member is engaged by locking dogs carried respectively in radial slots in the outer member. The inner member has transverse locking ribs which fit into corresponding locking ribs on the dogs. In a locked condition of the strut, the dogs are held in forcible engagement with the ribs on the inner member. Release of the strut is accomplished by manually shifting the locking sleeve, to a position wherein the locking dogs can shift outwardly in response to axial force applied between the members.

U.S. Pat. No. 3,469,871 shows a lockable coupling having telescoping inner and outer members and which employs two arcuate locking dogs carried in a circumferential groove of the inner member, and also utilizes a multiplicity of force-transmitting balls housed in radial slots of the inner member. Each locking dog is engaged by two balls. In operation, a release member or rod having a conical actuator portion engages the balls and shifts them radially, along with the arcuate locking dogs. During locking, the dogs are shifted laterally into inner annular grooves on the outer telescoping member. Locking and release of the telescoping members is accomplished by axially displacing a release member, by means of a pin-coupled release collar (64, FIG. 2) carried by the inner telescoping member.

Other constructions involving struts of the type employing radially shiftable locking components are illustrated in U.S. Pat. No. 3,390,874, and U.S. Pat. No. 3,367,689.

U.S. Pat. No. 4,362,415 illustrates a locking strut having a slidable locking collar which can be positively retained in a locking position by an external spring-biased locking lever.

U.S. Pat. No. 4,546,956 discloses a releaseable coupling for a hose that is attachable to a container of compressed gas. The arrangement is such that the coupling cannot be removed from the supply fitting until after the pressure in the container is reduced, to minimize the danger to personnel from an inadvertent, gas-propelled "fly off" of the coupling. Although the device provides a safety interlock feature, it is not a strut, and the structure and mode of operation of the device is different from that of the present invention, as will be apparent hereinbelow.

U.S. Pat. Nos. 4,014,467; 4,366,945; 4,453,748; 4,682,795; and 5,066,049 all involve releasable hose fittings/couplings having various types of locking structures that employ captive balls.

U.S. Pat. No. 4,960,344 discloses a coupling between a drive shaft and a driven shaft of a tractor. U.S. Pat. No. 4,453,449 relates to a re-useable, non-destructive hold-down apparatus employing locking balls, which apparatus grips a member such as a missile or projectile until a certain propulsion force is developed by the same, and which thereafter releases the member suddenly.

In connection with most prior struts, there have existed significant problems involving inadvertent release under load. Specifically, with either compressive or tensile loads applied between the telescoping members of the prior art struts, there was a danger that the operator could slide the locking collar to a release position while the strut was still under load, possibly leading to a sudden collapse of the strut and an accompanying uncontrollable swing or fall of the component being held, by virtue of its own weight. Such a condition was capable of causing serious injury to either the operator or to other personnel in the area.

In the past, struts of the type noted have been used with aircraft cowlings, in order to retain the cowlings in an open position as during maintenance, and/or servicing of the aircraft engines. Depending on the size of the aircraft, such cowlings can weight hundreds of pounds, and the potential of injury resulting from being struck by an inadvertently released cowling can be readily appreciated if one considers structures of such magnitude and size.

One solution to the problem of inadvertent release of a strut is set forth in U.S. Pat. No. 5,265,970 having common ownership with the present invention. FIGS. 6–9 of this patent illustrate the general concept involved, namely one of preliminary release of the load from the strut before an unlocking sleeve can be activated or shifted toward a release position. In particular, the load which normally existed between the extended inner and outer members of the strut while under compression also applied a locking force to the axially-slidable locking sleeve on one of the members. With load applied, not only were the members locked to each other, but the locking sleeve was locked to one member.

In order to effect release of the telescoping members, it was first necessary to remove the compressive load that the members were supporting. Thereafter, the members had to be manually extended by a slight amount, past their normal, extended, compressive load-bearing positions. With the members being held manually in such an over-extended position, they in effect freed the locking elements for the telescoping members from forcible engagement with the locking sleeve, enabling the latter to be thereby manually shifted axially so as to bring a relieved area on the inner surface of the sleeve into registration with the locking elements. As the strut members were subsequently retracted from this over-extended position, the locking elements were shifted into the relieved area of the sleeve and remained there as the collapsing movement continued. A full collapse of the strut could then be accomplished.

Because of the necessity to deliberately remove the load first, prior to moving the strut members at all, a good degree of control over the operation of the strut and its load was achievable, which contributed to the safety of the overall installation, as regards maintenance personnel and equipment.

With the advent of still larger and heavier aircraft having correspondingly larger cowlings, the need arises for longer and stronger safe compressive struts for such cowlings, based on the proven principles of the above-identified patent.

SUMMARY OF THE INVENTION

Accordingly, one object of the present invention is to provide an improved extensible and collapsible compressive strut construction adaptable for use in supporting large and heavy aircraft cowlings, which has inbuilt safety features that reduce the likelihood of injury to personnel who are working on such aircraft.

Another object of the invention is to provide an improved strut construction as above characterized, which has relatively few components that can be readily fabricated by usual manufacturing techniques.

A further object of the invention is to provide an improved strut construction as outlined above, which is especially simple and easy to understand and operate.

Yet another object of the invention is to provide an improved heavy-duty and extended-reach strut in accordance with the foregoing, wherein the operation is foolproof and reliable at all times.

Still another object of the invention is to provide an improved strut construction wherein the various components thereof can be easily assembled with a minimum amount of skilled labor.

A still further object of the invention is to provide an improved strut construction which is largely automatic in its operation, and wherein several automatic features thereof are concealed and proof against tampering.

A feature of the invention resides in a mode of operation which requires certain specified procedures or acts on the part of the operator, which acts preclude any possibility of malfunction or wrong operation that might otherwise jeopardize the safety of the workpeople.

The above objects are accomplished by a unique strut construction having telescoping members which automatically lock in extended position when the strut is initially extended, and which can only unlock by first downloading the strut, characterized by a manually-operable collar or part that can be latched in an unlocking posture only when placed therein after the unloading of the strut by power lifting of the cowling to its most extended position. A cooperative relationship is in effect established between such collar and the power actuating equipment for the cowling. In conjunction with the foregoing, an additional or third strut member is added, together with a concealed automatically releasable latch that is operable after collapsing of the other telescoping members has been completed.

Still other features and advantages of the invention will hereinafter appear.

DETAILED DESCRIPTION OF PREFERRED EMBODIMENT

The present improved strut is especially suited for use in aircraft, in connection with the raising and lowering of large and heavy cowlings (not shown). These cowlings are power operated and their movements precisely controlled, usually by hydraulic systems which have manual controls that are located at ground level. Service personnel which work on the underlying equipment of the aircraft are supported on platforms, which can be rolled into place after the cowlings have been opened or raised. The struts are normally employed in pairs, at opposite sides of an aircarft cowling.

Figure 1:
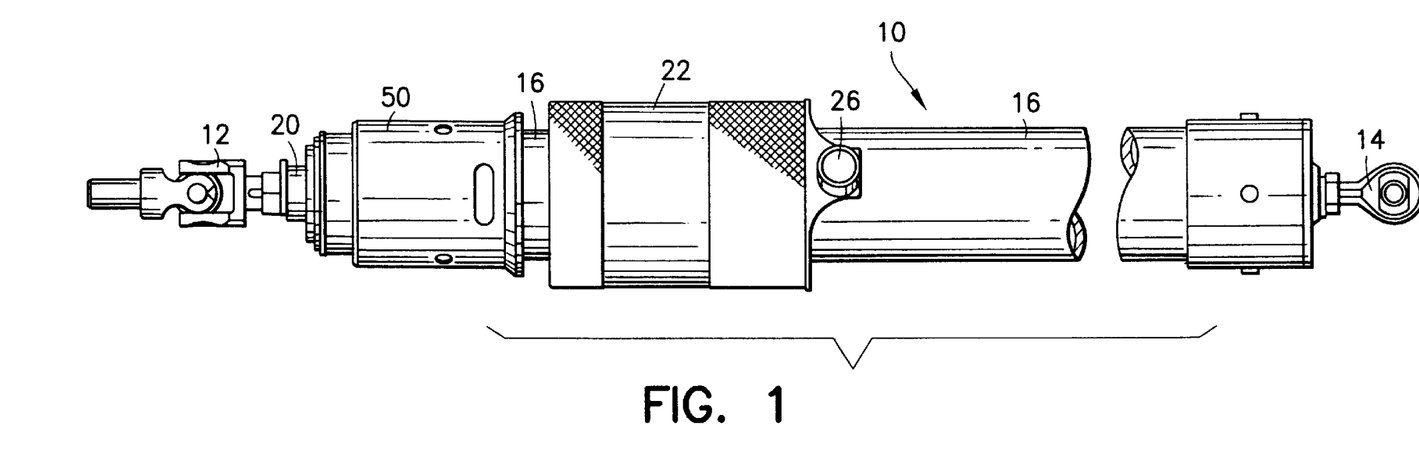
FIG. 1 is a fragmentary side elevational view of the improved extensible and collapsible strut of the invention.
Figure 2:
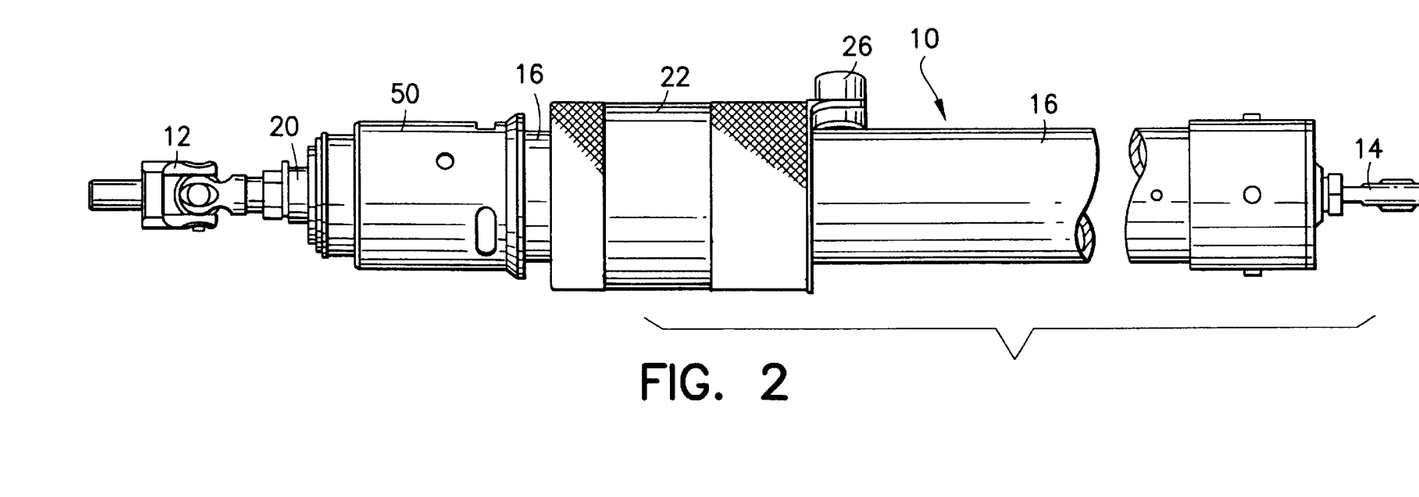
FIG. 2 is a view like FIG. 1 but with the strut turned on its axis by 90 degrees.

Referring to FIGS. 1–3, a strut 10 as provided by the invention can have an end fitting 12 adapted to be attached to a lower point of the aircraft framing at the cowling opening, and an opposite end fitting 14 adapted to be attached at a higher level to one portion of the cowling which is to be raised or opened.

Figure 3:
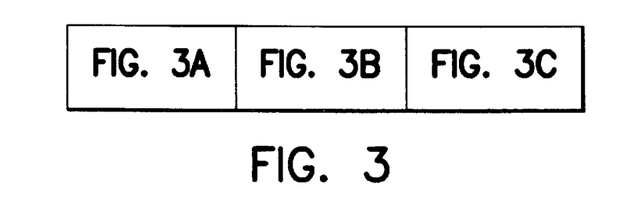
FIG. 3A is fragmentary axial sectional view of the left end portion of the strut, with the strut members in collapsed condition.
FIG. 3B is a fragmentary axial sectional view of the central portion of the strut in collapsed condition, constituting a continuation of FIG. 3A.
FIG. 3C is a fragmentary axial sectional view of the right end portion of the collapsed strut, constituting a continuation of FIG. 3B.
Figure 3A:
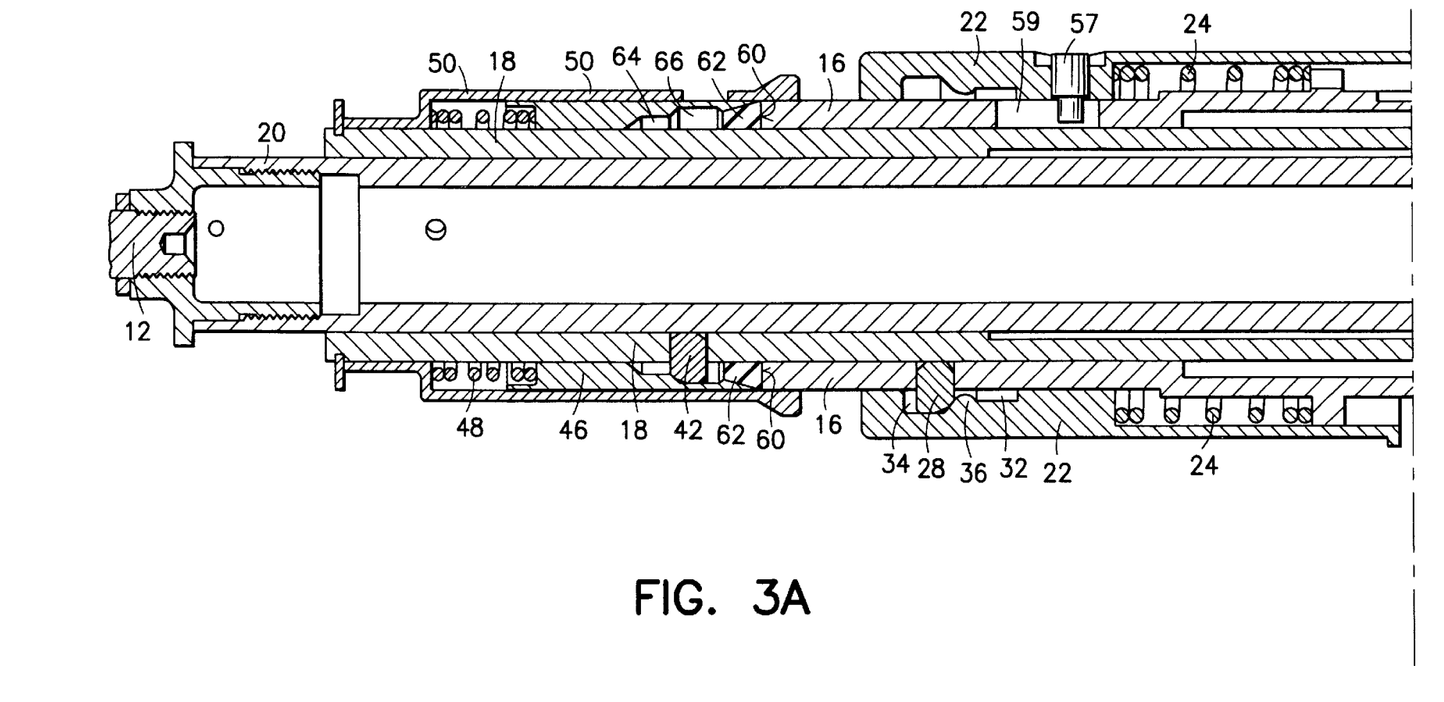
Figure 3B:
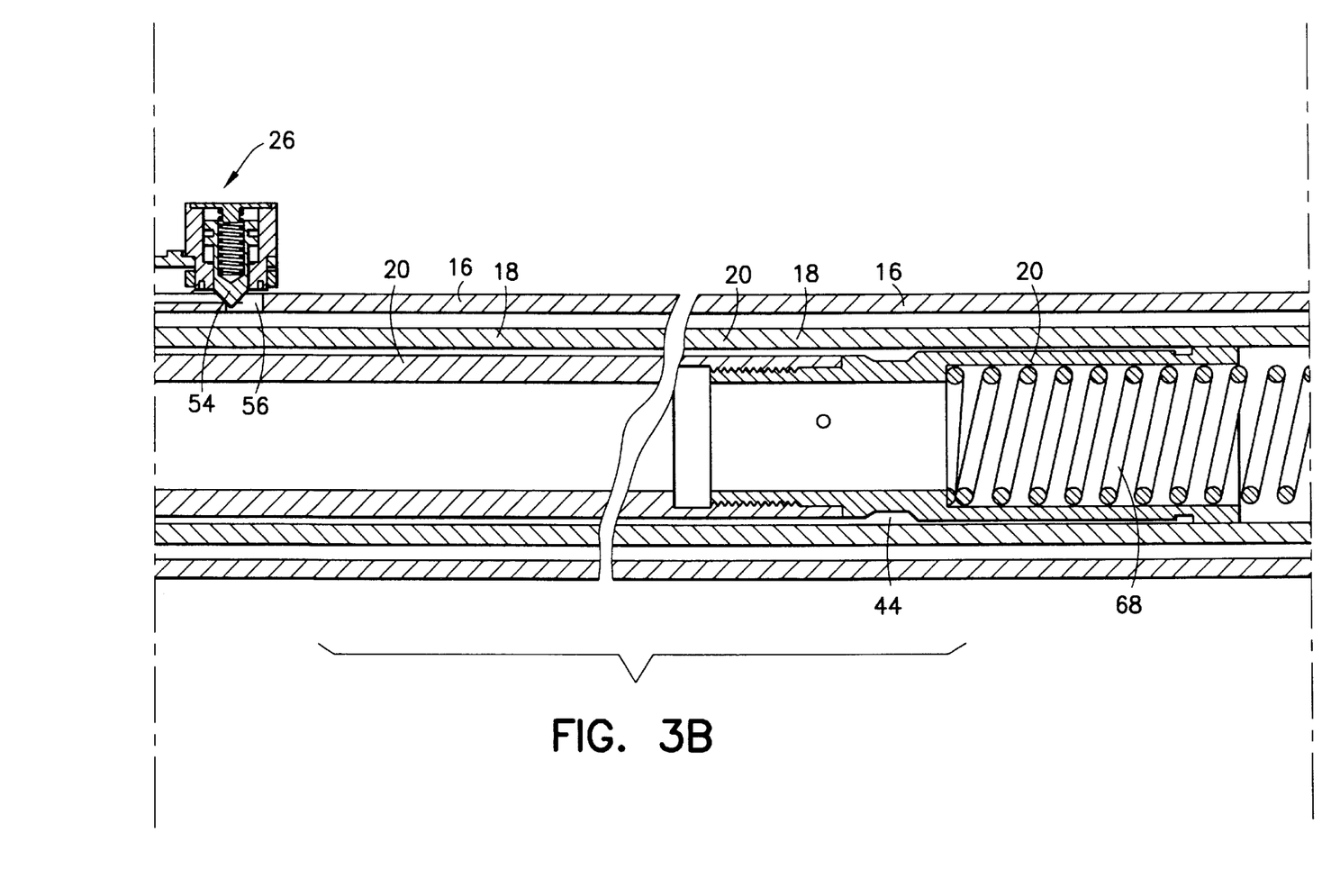
Figure 3C:
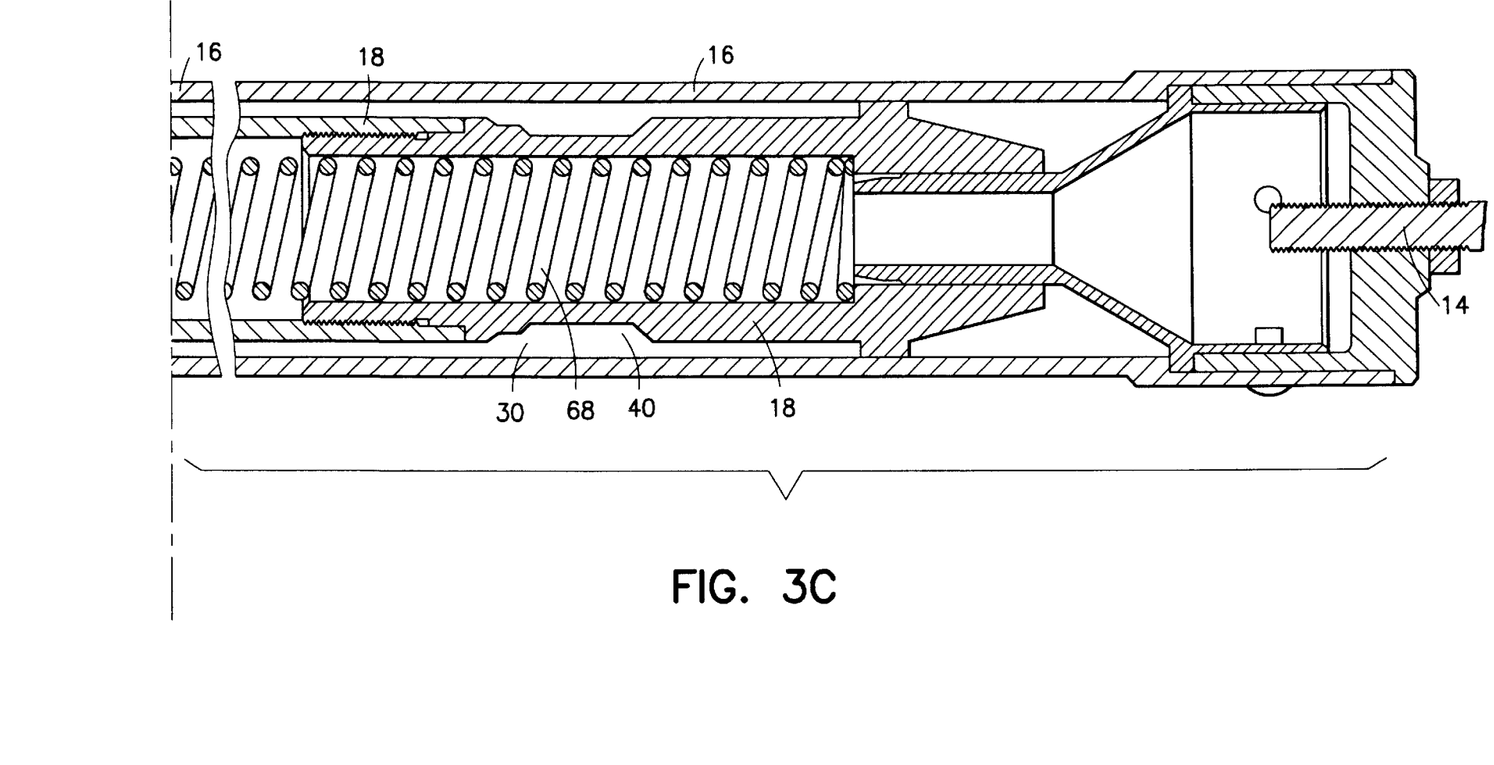

The strut 10 comprises a plurality of telescoping tubular sections shown here as three in number, a first or outermost section or member 16, an intermediate or second section or member 18, and an inner or third section or member 20. In FIGS. 3A, 3B and 3C these members are shown as being fully collapsed or telescoped with each other.

When a cowling is raised under power, the strut 10 becomes extended, and just prior to its full extension, the strut automatically becomes locked against retrograde movement. As the cowling reaches its uppermost position under power, the strut 10 becomes fully extended. Upon removal of the lifting power, the cowling slowly lowers a small distance whereupon the strut 10 assumes its full load, preventing further lowering of the cowling. This is the working position of the strut and cowling, and the working platform can then be rolled into place under the cowling.

At such time that the cowling is to be again lowered or closed, the workman descends from the platform and power lifts the cowling to its fully raised position. This action removes the loading on the strut 10. He or she then ascends the platform again and shifts a collar 22 on the strut 10 against the action of a spring 24, to a releasing or unblocking position of the collar whereupon an automatic latch device 26 latches the collar in its releasing position. The workperson than descends from and removes the platform and now operates the power controls to lower the cowling into place.

The automatic locking of the strut as the cowling is being raised, and the later unlocking of the strut only when the cowling is under power-lifting, with subsequent lowering of the cowling only when the workperson is off the platform, are important safety features of the invention.

The above-mentioned U.S. Pat. No. 5,265,970 having common ownership with the present invention, reveals in general structural details regarding the sliding relationship of telescopic members such as are utilized in the present invention, and the disclosure of this patent as it relates to such details, is incorporated in the present description.

Figure 4:
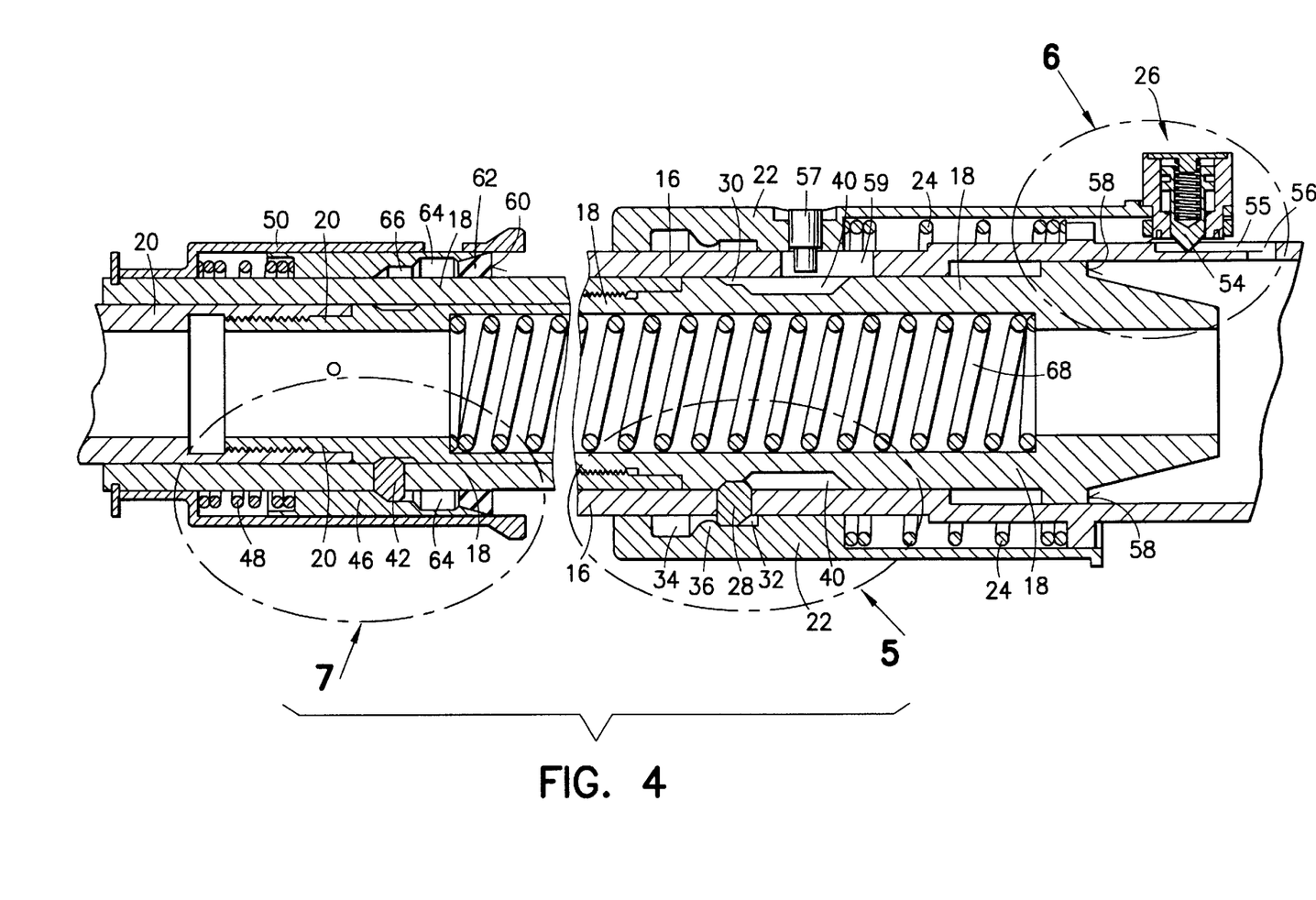
FIG. 4 is a fragmentary axial sectional view of center portions of the strut when it is in an extended, normal operative compressive load-bearing position.
Figure 5:
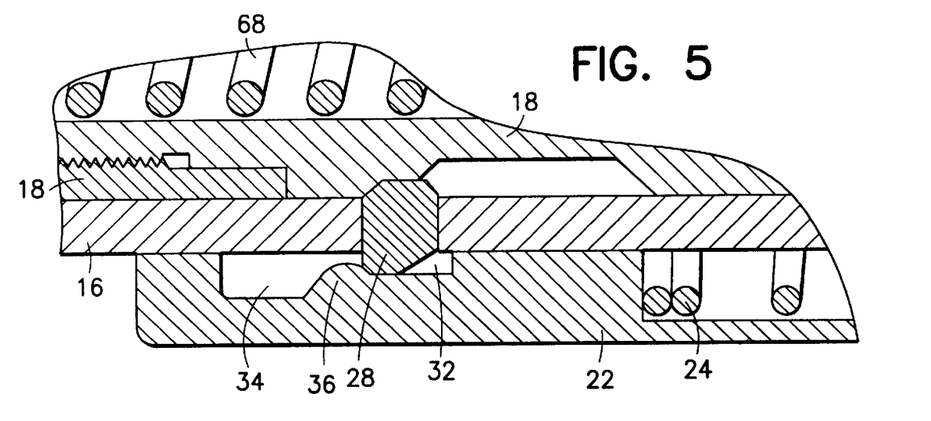
FIG. 5 is an enlarged fragmentary section of the strut, showing that portion encircled in FIG. 4 which is indicated by the arrow 5.
Figure 6:
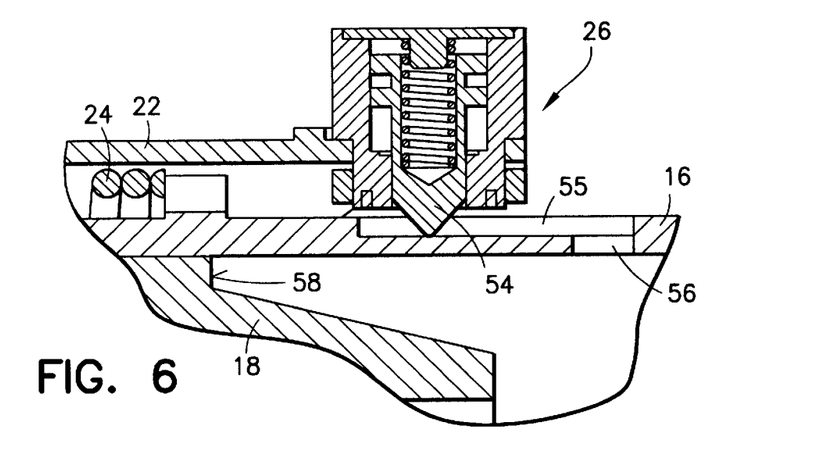
FIG. 6 is an enlarged fragmentary section of the strut, showing that portion encircled in FIG. 4 which is indicated by the arrow 6.
Figure 7:
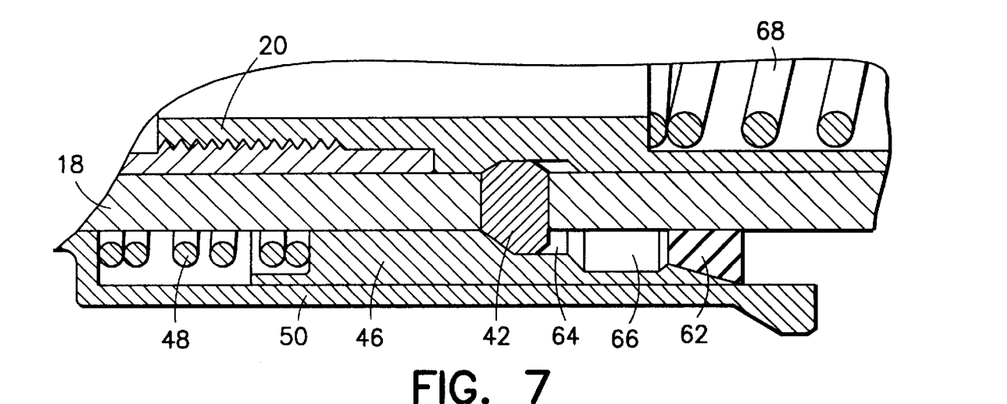
FIG. 7 is an enlarged fragmentary section of the strut, showing that portion encircled in FIG. 4 which is indicated by the arrow 7.

Considering now the extending movement of the strut 10, starting with FIGS. 3A, 3B and 3C, the outermost or first telescoping member 16 can be shifted to the right from the position shown, withdrawing it from the intermediate member 18 until a locking dog 28 which is carried by the member 16 reaches a shallow pocket 30 in the exterior of the intermediate member 18. This position is shown in FIG. 4.

The collar 22 which surrounds the dog 28 has a shallow pocket 32 and a deep release pocket 34 respectively, with a camming shoulder 36 interposed therebetween, and upon the attainment of the above extending movement of the member 16, a compression spring 24 snaps the collar 22 to the left, forcing the dog 28 inward and enabling a bypassing of the dog 28 by the camming shoulder 36. At this point, the first and second telescoping members 16 and 18 are unidirectionally locked in step.

As the extending movement of the first member 16 continues, the locking dog 28 advances into a deep pocket 40. See FIGS. 8–11. The presence of the dog 28 in either of the pockets 30 and 40 now effectively locks the members 16 and 18 to each other against a compressive load.

Further advance of the now-extended members 16 and 18 results in these members being withdrawn from the innermost member 20. A locking dog 42 carried by the intermediate member 18 now slides along the outer surface of the innermost member 20 until it is snapped into a pocket 44 (FIGS. 4 and 7) by a camming sleeve 46 that is carried by the second member 18 and spring charged by a spring 48. The inner member 20 is now locked to the other two members 16 and 18, and the strut 10 is fully extended and in load-bearing position. This extended load-bearing position of the strut is seen in FIGS. 4, 5, 6 and 7. FIGS. 8–11 show a super-extended non-load-bearing position of the strut 10, which occurs when the cowling is first power raised to its uppermost halted position.

A second collar 50 is affixed to the member 18, surrounding the sleeve 46 and spring 48 to conceal these.

At this point, the power from the cowling actuator can be removed by the workperson at the ground level, and the cowling will be supported by the extended strut 10, as in the positions of FIGS. 4–7.

Figure 8:
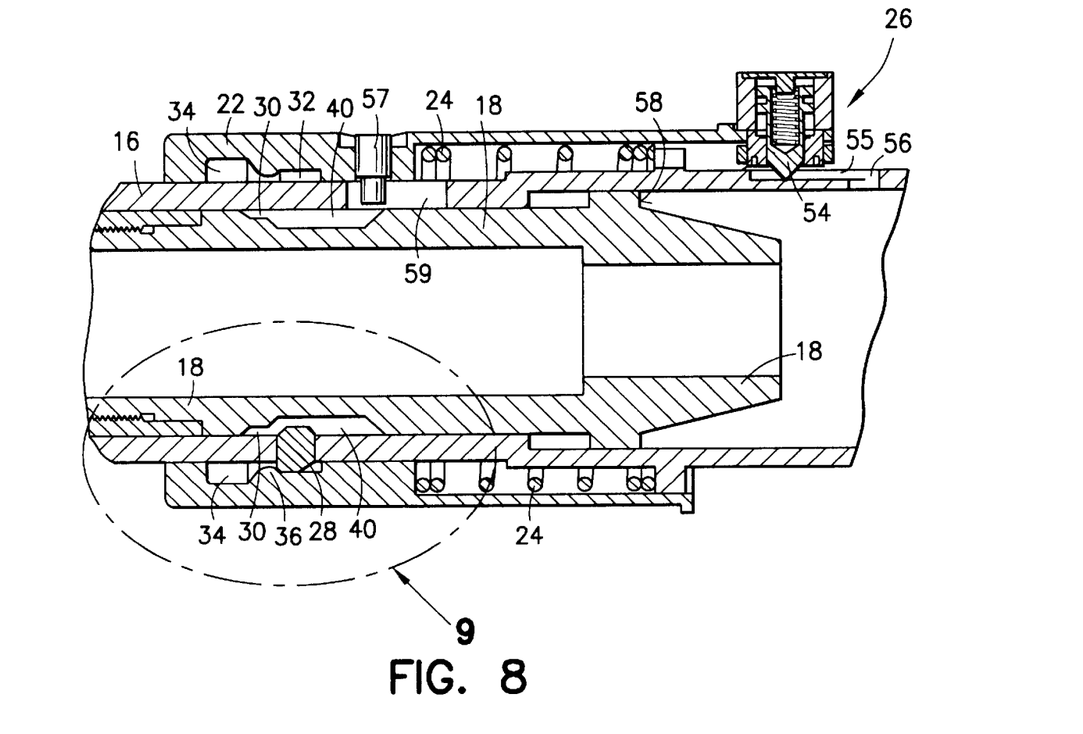
FIG. 8 is an enlarged fragmentary axial sectional view of a central portion of the strut, with the members thereof in a further extended, unlocking posture as a preliminary to unlocking and collapsing of the strut.
Figure 9:
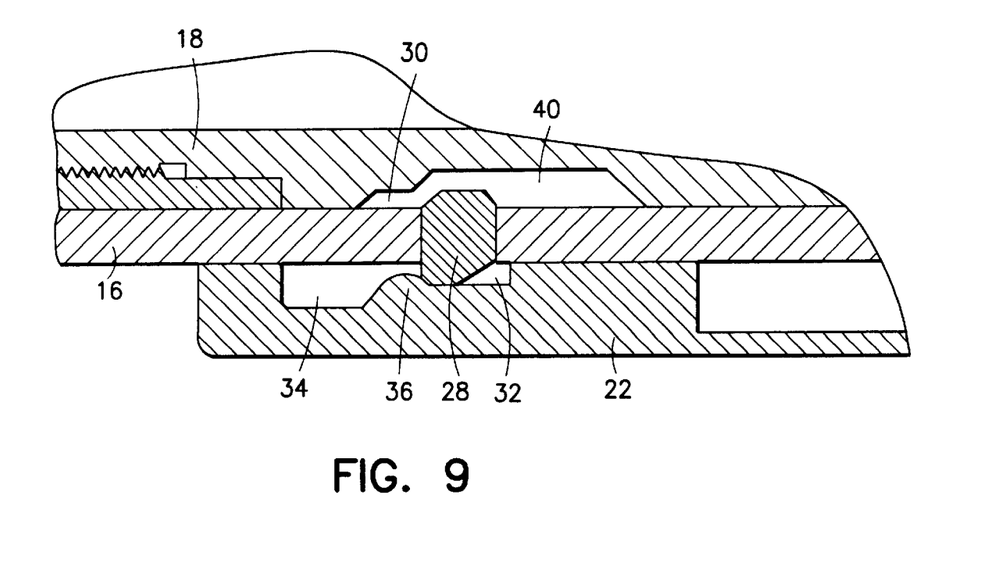
FIG. 9 is an enlarged fragmentary axial sectional view of those portions of the strut which are encircled and indicated by the arrow 9 in FIG. 8.
Figure 10:
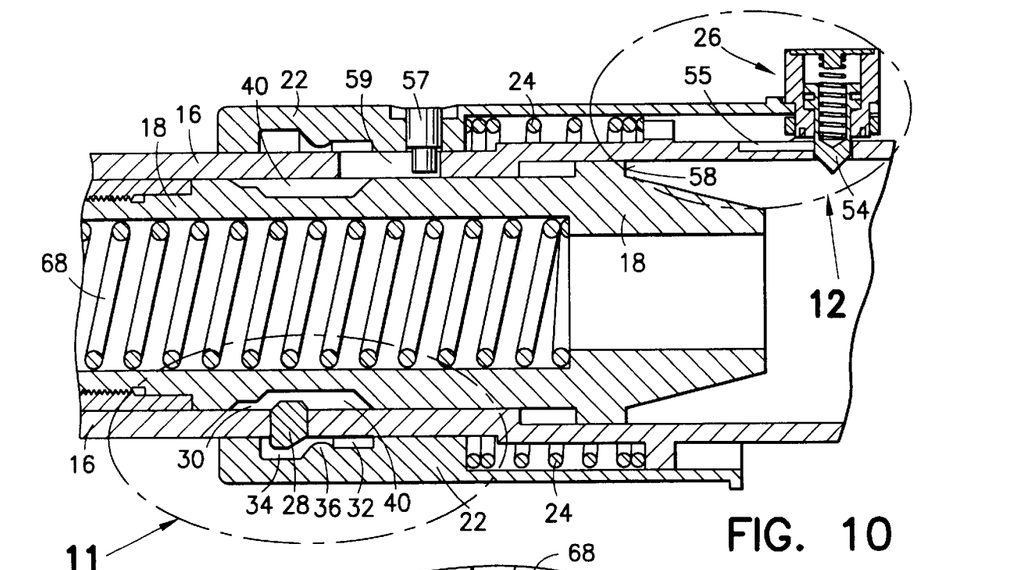
FIG. 10 is an enlarged fragmentary axial sectional view of the strut in its further extended position and with the release collar of the strut activated to its releasing position.
Figure 11:
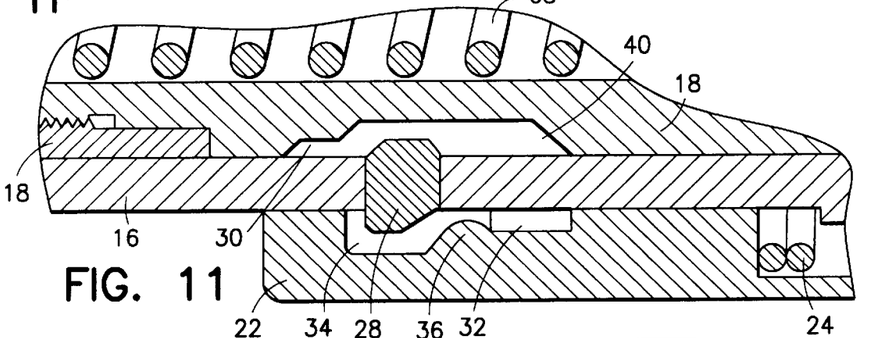
FIG. 11 is an enlarged fragmentary axial sectional view of those portions of the strut which are encircled and indicated by the arrow 11 in FIG. 10.
Figure 12:
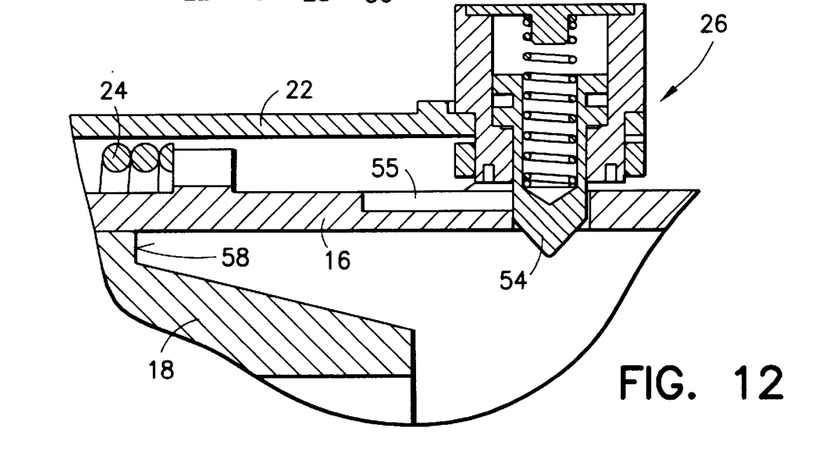
FIG. 12 is an enlarged fragmentary axial sectional view of those portions of the strut which are encircled and indicated by the arrow 12 in FIG. 10.

The operation for lowering the cowling is as follows: The workperson at the ground lever applies power to lift the cowling to the upper limit of its travel. The corresponding positions of the components of the strut 10 are as shown in FIGS. 8 and 9. The workperson now mounts the work platform, and shifts the collar 22 to the right. This will enable the latch 26 to become effective, locking the collar 22 in its rightmost, unlocking position on the first telescoping member 16. See FIGS. 10 and 12, wherein a spring-charged button or pin 54 of the latch 26 leaves its groove or track 55 and enters a hole 56 (FIG. 3B) in the wall of the member 16. The locking dog 28 is now able to enter the deep pocket 34 of the collar 22, as shown in FIG. 11. Thus the members 16 and 18 are uncoupled or unlocked from each other. A keying pin 57 in a slot 59 prevents turning of the collar 22 on the member 16.

The action of the collar 22 can be further explained as follows: There is a first release means (pocket 34) which is responsive to shifting of the collar 22 to its unblocking position of FIG. 10. This will render inoperative the first locking means 28 which has been blocking the collapsing movement of the telescoping members 16 and 18. Thereby the members 16 and 18 can then be shifted to their collapsed positions.

The above explanation can also be rephrased as follows: The invention provides a means in the form of the space 34 which is responsive to said shifting of the spring-charged release collar 22 to its unblocking position, for rendering inoperative the said blocking means 28 which blocks the collapsing movement of the telescoping members 16 and 18, thereby to enable said telescoping members to be relatively shifted to their collapsed position.

Figure 13:
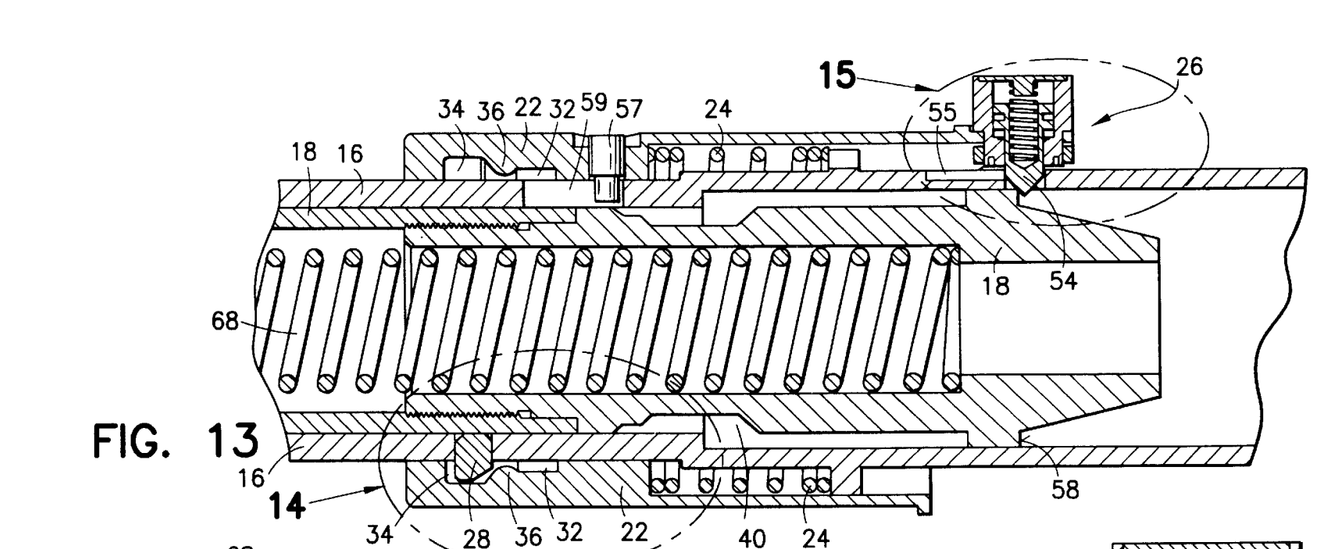
FIG. 13 is an enlarged fragmentary axial sectional view of the central portion of the strut showing the positions of the members at the beginning of the collapsing movement.
Figure 14:
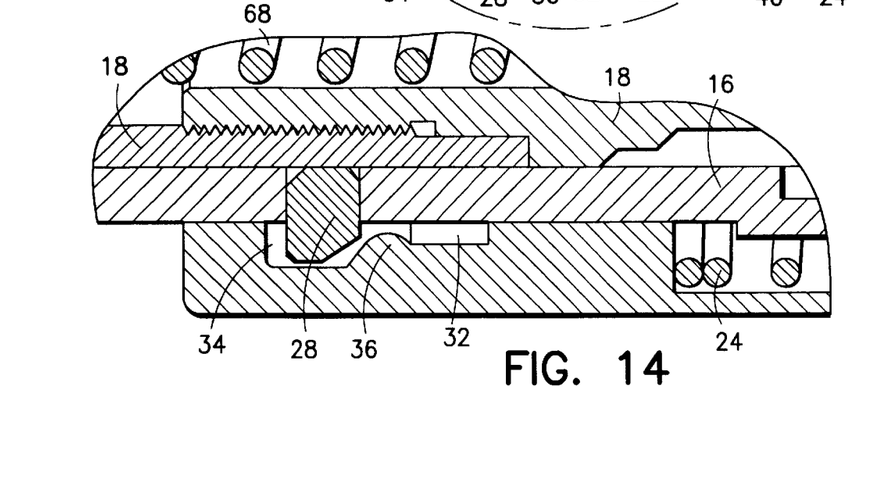
FIG. 14 is an enlarged fragmentary axial sectional view of those portions of the strut which are encircled and indicated by the arrow 14 in FIG. 13.
Figure 15:
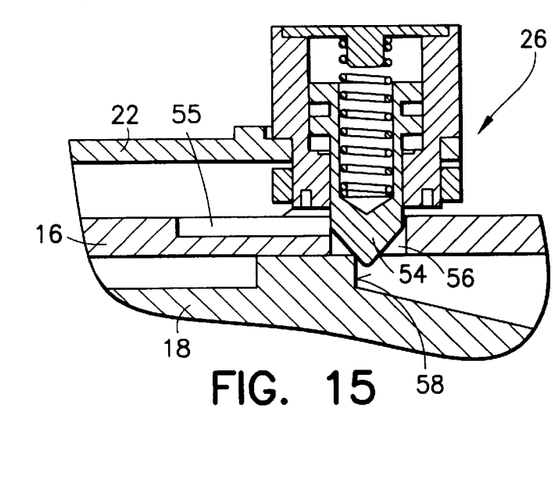
FIG. 15 is an enlarged fragmentary axial sectional view of those portions of the strut which are encircled and indicated by the arrow 15 in FIG. 13.

The workperson descends from the platform, and operates the power source for the cowling, to lower the same. During such lowering process, the button or pin 54, which has a camming tip or point, will encounter an abutment shoulder 58 on the second telescoping member 18, FIGS. 13 and 15, camming the pin 54 radially outward of the hole 56. This releases the latch 26 and enables the collar 22 to snap back under the urging of the spring 24 toward the collar's locking position shown in FIGS. 3A, 3B and 4.

Figure 16:
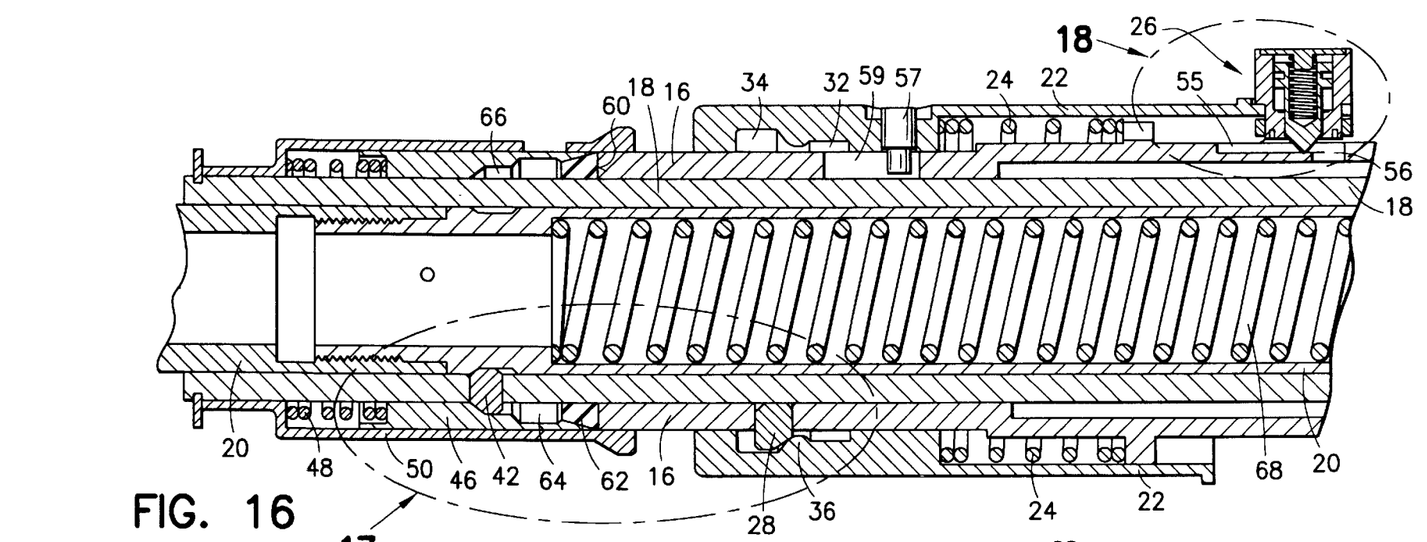
FIG. 16 is an enlarged fragmentary axial sectional view of the central portion of the strut showing the positions of the members at a later stage in the collapsing movement.
Figure 17:
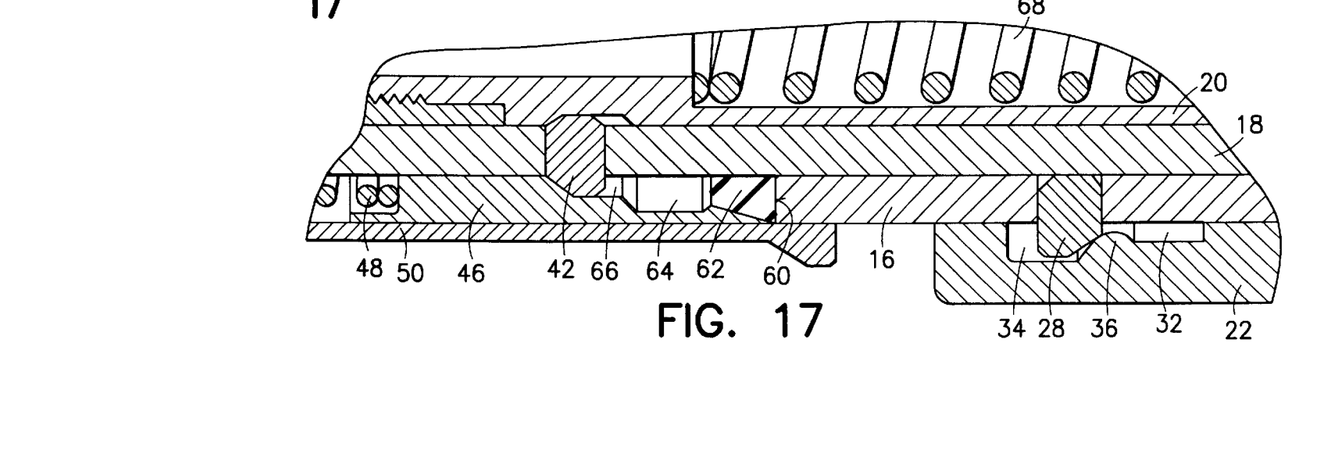
FIG. 17 is an enlarged fragmentary axial sectional view of those portions of the strut which are encircled and indicated by the arrow 17 in FIG. 16.
Figure 18:
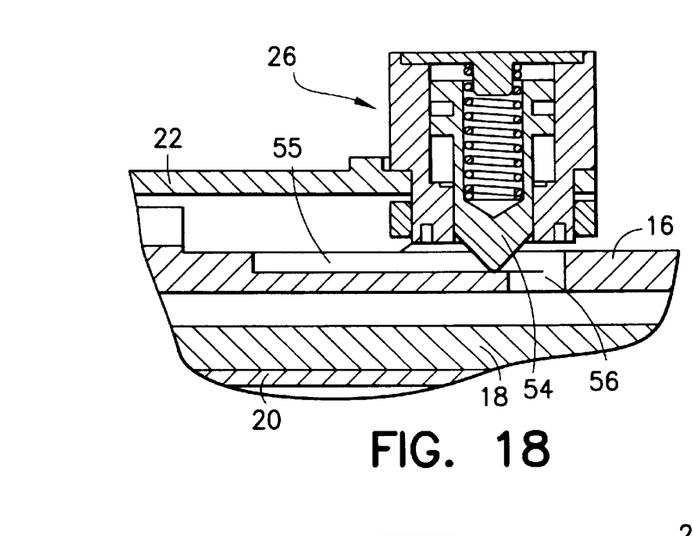
FIG. 18 is an enlarged fragmentary axial sectional view of those portions of the strut which are encircled and indicated by the arrow 18 in FIG. 16 during the final collapsing movement of the strut.
Figure 19:
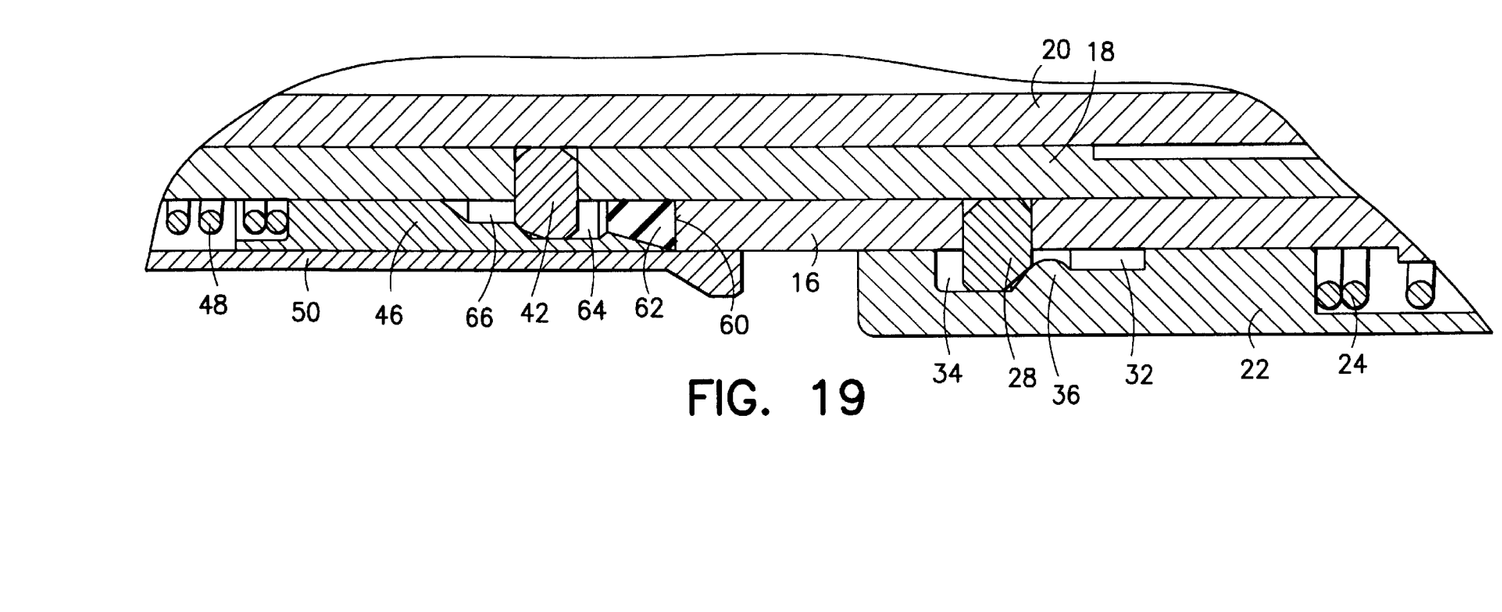
FIG. 19 is an enlarged fragmentary axial sectional view of other central portions of the strut during its final collapsing movement.
Figure 20:
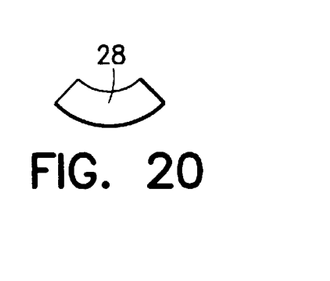
FIG. 20 is a side elevational view of one of the locking dogs of the strut.

The cowling continues to lower under power control, with the telescoping members 16 and 18 now fully telescoping. At this point, the inner end 60 of the member 16 strikes a rubber O-ring or bumper 62 carried by the sleeve 46 on the member 18, FIGS. 4, 16 and 17, causing the sleeve 46 to shift to the left and to provide the space or deep pocket 64 which then becomes available for permitting radial outward movement of the locking dog 42. The inner telescoping member 20 is thus released from the intermediate member 18, whereupon the strut 10 can continue its collapsing movement so as to arrive at the starting positions of FIGS. 3A, 3B and 3C. As seen in FIG. 4, for example, the sleeve 46 has a shallow pocket 66 as well as the deep pocket 64.

The interior of the second member 18 can optionally have a compression coil spring 68 to minimize looseness and maintain an expansive bias between the members 18 and 20.

From the foregoing it can be seen that I have provided a unique, multi-sectional compressive-load bearing strut with desirable automatic safety features, which makes the maintenance work on large aircraft easier and safer to carry out.

What is claimed is:

1. An extensible and collapsible strut comprising, in combination:
   a) first and second telescoping members which are relatively axially shiftable between a collapsed inoperative strut position wherein the members are nested together, a non load-bearing position, and an almost fully extended operative load-bearing position wherein the members are only partially nested,
   b) blocking means responsive to relative shifting of said telescoping members to their partially extended operative position, for automatically blocking collapsing movement of the members,
   c) said blocking means including a spring-charged collar which is axially slidable on the first telescoping member between axially spaced-apart blocking and unblocking positions,
   d) automatic latch means responsive to manual shifting of said spring-charged collar to its unblocking axial position against the spring-action thereof, for locking said collar in said unblocking axial position and against axial movement in either of opposite directions on said first telescoping member, and
   e) means responsive to shifting of the spring-charged collar to its unblocking position, for rendering inoperative the said blocking means which blocks the collapsing movement of the telescoping members, thereby to enable said telescoping members to be relatively shifted to their collapsed position.

2. An extensible and collapsible strut as set forth in claim 1, and further including:
   a) means for automatically rendering inoperative said latch means during the collapsing movement of the telescoping members.

3. An extensible and collapsible strut as set forth in claim 2, and further including:
   a) a third telescoping member which telescopes in the said second telescoping member,
   b) means for automatically locking together said second and third telescoping members when the same are relatively extended with respect to each other, and
   c) means responsive to collapsing movement of said second and first telescoping members, for rendering inoperative said means for automatically locking together said second and third telescoping members.

4. An extensible and collapsible strut as set forth in claim 1, wherein:
   a) said latch means comprises a part which is movably carried by said collar and is engageable by said first telescoping member.

5. An extensible and collapsible strut as set forth in claim 4, wherein:
   a) said part comprising the latch means is constituted as a button mounted on a wall of the said collar.

6. An extensible and collapsible strut as set forth in claim 4, wherein:
   a) said part comprising the latch means is constituted as a button mounted on a wall of the said collar,
   b) said button being engageable with the said first telescoping member.

7. An extensible and collapsible strut as set forth in claim 4, wherein:
   a) the means for rendering inoperative said blocking means during the collapsing movement of the telescoping members comprises a cam portion of the said part, engageable with the said second telescoping member.

8. An extensible and collapsible strut as set forth in claim 7, wherein:
   a) said second telescoping member has a shoulder which is engageable with the cam portion on said movable part.

9. An extensible and collapsible strut as set forth in claim 8, wherein:
   a) the first telescoping member has a track which the said part follows with axial movement.

10. An extensible and collapsible strut comprising, in combination:
    a) first, second and third telescoping members which are shiftable between collapsed inoperative strut positions wherein the members are nested together, and extended positions wherein the members are only partially nested,
    b) automatic blocking means responsive to relative shifting of said second and third telescoping members to their extended operative positions, for blocking collapsing movement of said second and third members,
    c) said blocking means including an axially movable collar disposed on said second telescoping member, said collar having axially spaced-apart blocking and unblocking positions thereon,
    d) said collar being spring-biased to its blocking axial position, and
    e) cooperable means on said collar and first telescoping member, for automatically axially driving said collar into its unblocking axial position and against the action of its spring bias and in response to shifting of said first telescoping member to a collapsed position on said second member.

11. An extensible and collapsible strut as set forth in claim 10, wherein:
   a) said automatic means which is responsive to relative shifting of said second and third telescoping members to their extended operative positions comprises a latching part movably mounted on the second telescoping member and engageable with the third telescoping member.

12. An extensible and collapsible strut as set forth in claim 11, wherein:
   a) said latching part comprises a dog movable on the second telescoping member, engageable with said third telescoping member.

13. An extensible and collapsible strut comprising, in combination:
   a) outer and inner telescoping members capable of relative extending and collapsing movements, an outer strut member having a socket in which a locking dog is held captive and movable,
   b) a spring-charged release collar held captive and axially slidable on the outer strut member between axially-spaced blocking and release positions, said collar being biased to its blocking axial position and having spaced-apart shallow and deep internal pockets for respectively receiving, depending on its locking or releasing axial position, portions of said captive dog,
   c) shoulder means on the inner strut member, having shallow and deep pockets to respectively receive other portions of said captive dog,
   d) said captive dog, socket of the outer strut member, and shoulder means restricting axial movement of the release collar and restricting full telescoping collapsing movement of the strut members when the release collar is in its blocking axial position and portions of the dog occupy the shallow pockets of the collar and shoulder means, and alternatively enabling full telescoping collapsing movement of the strut members to be effected when the release collar is in its releasing axial position and other portions of the dog occupy the deep pocket of the collar, and
   e) latch means responsive to manual axial shifting of said spring-charged collar to its unblocking axial position against the spring action thereof, for locking said collar in said unblocking axial position and against axial movement in either of opposite directions on said outer strut member.

14. An extensible and collapsible strut as set forth in claim 3, wherein:
   a) said release means for rendering inoperative the blocking means which automatically locks together the second and third telescopic members includes a sleeve movably carried by the second said member and an abutment surface on the first said member, adapted to strike said sleeve during collapsing movement of the first said member, and
   b) shock absorber means for minimizing the impact when said sleeve is struck by said abutment surface.

15. An extensible and collapsible strut as set forth in claim 14, wherein:
   a) said shock absorber means comprises a rubber O-ring carried by the said second telescoping member.

* * * * *